United States Patent
Kim et al.

(10) Patent No.: US 6,661,489 B1
(45) Date of Patent: Dec. 9, 2003

(54) DOMAIN-DIVIDED TWISTED NEMATIC LIQUID CRYSTAL CELL AND METHOD OF FABRICATING THEREOF HAVING A DIFFERENTIALLY REMOVED PHOTOSENSITIVE LAYER

(75) Inventors: Jung Ha Kim, Seoul (KR); Jong Hyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/084,582

(22) Filed: May 27, 1998

(30) Foreign Application Priority Data

May 28, 1997 (KR) ........................................ 1997-21139

(51) Int. Cl.$^7$ ............................................ G02F 1/1337
(52) U.S. Cl. ...................................... 349/124; 349/129
(58) Field of Search ................................. 349/124, 129

(56) References Cited

U.S. PATENT DOCUMENTS

| | | |
|---|---|---|
| 5,309,264 A | 5/1994 | Lien et al. |
| 5,434,687 A | 7/1995 | Kawata et al. |
| 5,473,455 A | 12/1995 | Koike et al. |
| 5,504,604 A | 4/1996 | Takatori et al. |
| 5,576,862 A | 11/1996 | Sugiyama et al. |
| 5,579,140 A | 11/1996 | Yamahara et al. |
| 5,579,141 A | 11/1996 | Suzuki et al. |
| 5,594,570 A | 1/1997 | Hirata et al. |
| 5,604,615 A | 2/1997 | Iwagoe et al. |
| 5,608,556 A | 3/1997 | Koma |
| 5,623,354 A | 4/1997 | Lien et al. |
| 5,627,667 A | 5/1997 | Mizushima et al. |
| 5,629,056 A | 5/1997 | Koike et al. |
| 5,652,634 A | 7/1997 | Hirata et al. |
| 5,657,102 A | 8/1997 | Mizushima et al. |
| 5,657,105 A | 8/1997 | McCartney |
| 5,666,178 A | 9/1997 | Hirata et al. |
| 5,691,792 A | 11/1997 | Mizushima et al. |
| 5,790,221 A | 8/1998 | Hsieh |
| 5,850,273 A * | 12/1998 | Terashita et al. ............ 349/129 |
| 6,025,900 A * | 2/2000 | Yoon et al. ................. 349/123 |

FOREIGN PATENT DOCUMENTS

JP 8-328009 * 12/1996

* cited by examiner

Primary Examiner—Walter J Malinowski
(74) Attorney, Agent, or Firm—Finnegan, Henderson, Farabow, Garrett & Dunner, L.L.P.

(57) ABSTRACT

A domain-divided twisted nematic crystal cell and method of fabricating thereof. The method of the present invention comprises the steps of providing first and second substrates, forming a photo-alignment layer in each domain of the first substrate having two or more domains, wherein thicknesses of the photo-alignment layers corresponding to the domains are different from each other. A pretilt angle in each domain is formed by light irradiation on the photo-alignment layer, wherein the pretilt angles corresponding to the domains are different from each other due to the different thicknesses of the photo-alignment layer in different domains. The first and second substrates are positioned to face each other, and liquid crystal is injected between the first and second substrates.

17 Claims, 7 Drawing Sheets

DOMAIN-DIVIDED TWISTED NEMATIC LIQUID CRYSTAL CELL AND METHOD OF FABRICATING THEREOF HAVING A DIFFERENTIALLY REMOVED PHOTOSENSITIVE LAYER

BACKGROUND OF THE INVENTION

1. Field of the Invention

The present invention relates to a domain-divided twisted nematic liquid crystal cell and a method for fabricating thereof.

2. Description of the Prior Art

A TN LC cell has a characteristic such that the light transmittance of each gray level varies according to the viewing angle.

FIG. 1A is a graph showing the relationship between light transmittance of the TN LC cell and voltage. FIG. 1B is a graph showing the relationship between light transmittance and the right-and-left directional viewing angle of the TN LC cell. FIG. 1C is a graph showing the relationship between light transmittance and the up-and-down directional viewing angle of the TN LC cell.

As shown in FIGS. 1B and 1C, light transmittance is symmetrical with respect to the right-and-left directional viewing angle, but light transmittance is asymmetrical with respect to the up-and-down directional viewing angle. That is, there is a region in which the gray inverts in the up-and-down directional viewing angle. Therefore, this results in a problem that the viewing angle becomes narrow. This gray inversion is caused by the alignment of the TN LC cell.

As a method solving this problem of narrow viewing angle, a domain-divided TN LC cell (DDTN LC cell) has been proposed. The DDTN LC cell has generally been fabricated by a rubbing method or a photo-alignment method.

Fabricating the DDTN LC cell by the rubbing method, however, requires complex procedures and high manufacturing cost. For example, in the rubbing method, each substrate must undergo a polyamide or a polyimide coating process twice, photo-lithography process once, and a rubbing process once. Moreover, because the rubbing method includes a photo-lithography process, it is difficult to secure pretilt angle stability of the polyamide or polyimide alignment layer and reliability of the panel.

The photo-alignment method too has problems, such as lengthened light irradiation time. FIGS. 2A to 2D are section views showing the conventional photo-alignment process of DDTN LC cell. In FIG. 2A, a photo-alignment layer 12 is formed by coating photo-alignment material uniformly on a substrate 10. And in FIG. 2B, a first pretilt angle α1 is formed by light irradiation of the substrate. As shown in FIG. 2C, a first domain I is shielded by a mask 14, and additional light irradiation is performed on only a second domain II. As a result, compared with first domain I, because the quantity of light irradiation is more in second domain II, as shown in FIG. 2D, second pretilt angle α2 which is lower than first pretilt angle α1 is formed.

As previously mentioned, the conventional photo-alignment method has a problem that the overall light irradiation time becomes long. This is caused by the additional step of light irradiation and the light absorption with using the mask. Furthermore, this makes the method complex and also generates dust in the process of providing and removing the mask.

SUMMARY OF THE INVENTION

Accordingly, it is an object of the present invention to provide more simple and reliable method for fabricating a domain-divided twisted nematic liquid crystal cell.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises: providing a first substrate having a first domain and a second domain; forming a first photo-alignment layer having a first thickness over the first domain and a second photo-alignment layer having a second thickness different from the first thickness over the second domain; and irradiating the first and second photo-alignment layers with a light to impart first and second pretilt angles different from each other, respectively.

In a further aspect, the invention comprises: a first substrate having a first domain and a second domain; and a first photo-alignment layer and a second photo-alignment layer over the first and second domains, respectively. The first photo-alignment layer has a thickness different from the thickness of the second photo-alignment layer.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DETAILED DESCRIPTION OF THE INVENTION

Reference will now be made in detail to the present preferred embodiments of the invention, examples of which are illustrated in the accompanying drawings.

For a given quantity of light irradiated, the pretilt angle of a photo-alignment layer depends on the thickness of the photo-alignment layer. For example, generally, the thicker the photo-alignment layer, the smaller the pretilt angle becomes. Hence, when one pixel is divided into two or more domains, and the photo-alignment layers formed over the domains have different thicknesses, and a light such as ultraviolet light is irradiated, then although the irradiating time is the same, the pretilt angle in each domain becomes different from each other. That is, the domain whose thickness of the photo-alignment layer is thick has a relatively low pretilt angle, but the domain whose thickness of the photo-alignment layer is thin has a relatively high pretilt angle.

FIGS. 3A to 3F are section views showing a method of fabricating a DDTN LC cell according to a first embodiment of the present invention.

Figure 1A:
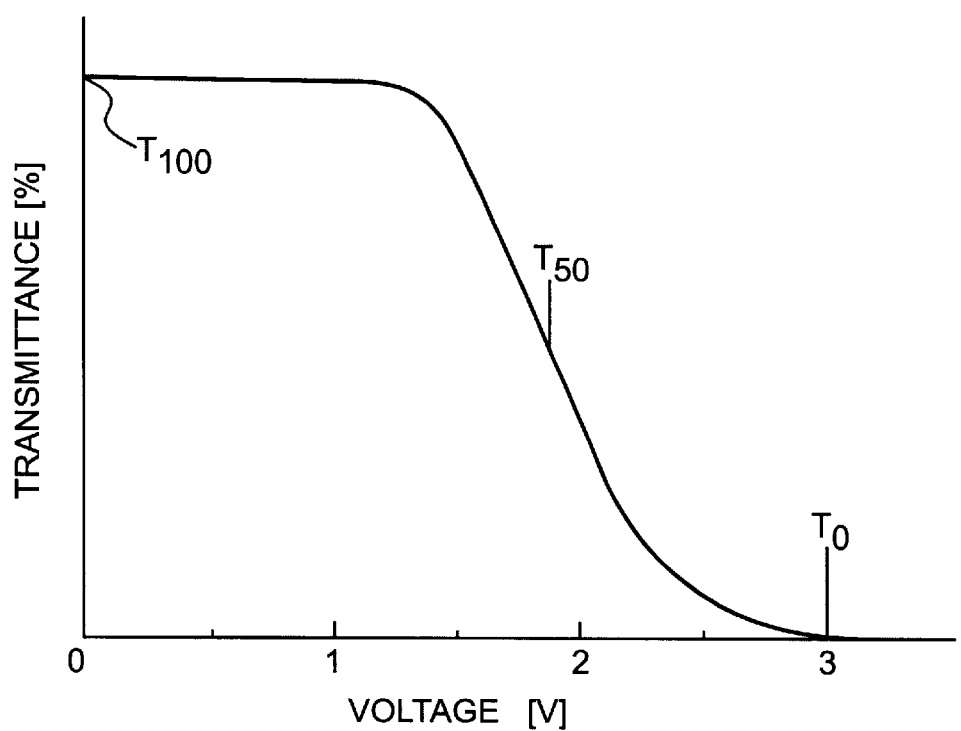
FIGS. 1A to 1C are graphs showing light transmittance characteristics of the conventional TN LC cell.
Figure 1B:
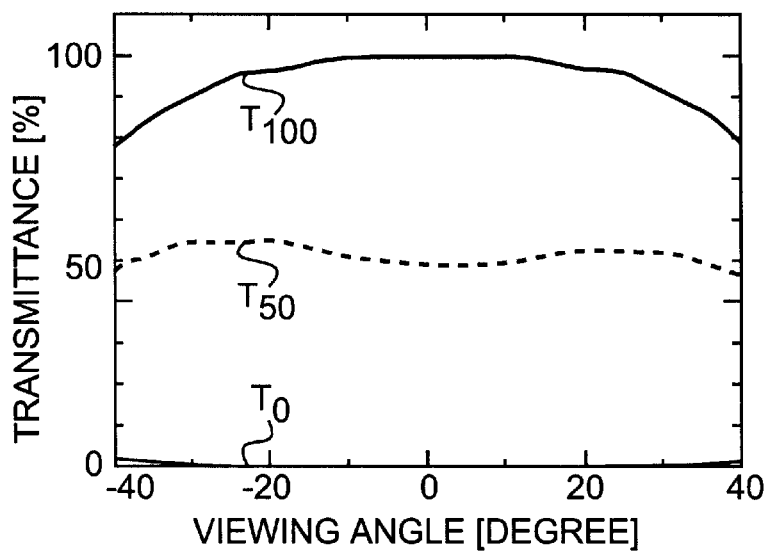
Figure 1C:
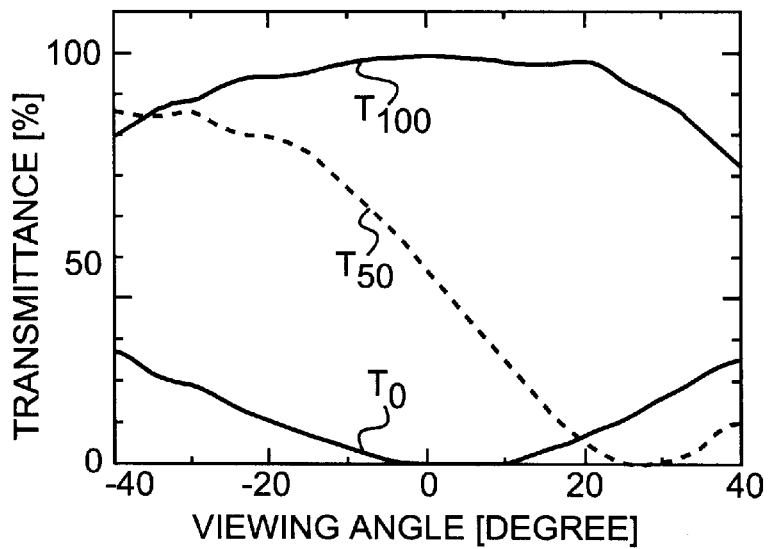
Figure 2A:
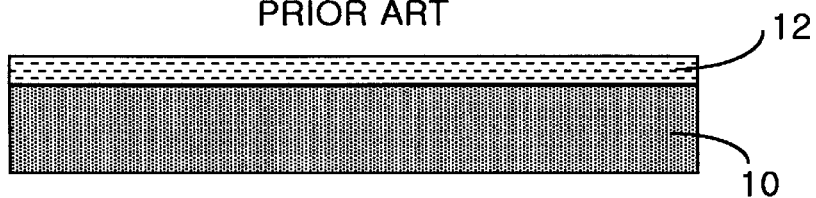
FIGS. 2A to 2D are section views showing the conventional photo-alignment process of fabricating a DDTN LC cell.
Figure 2B:
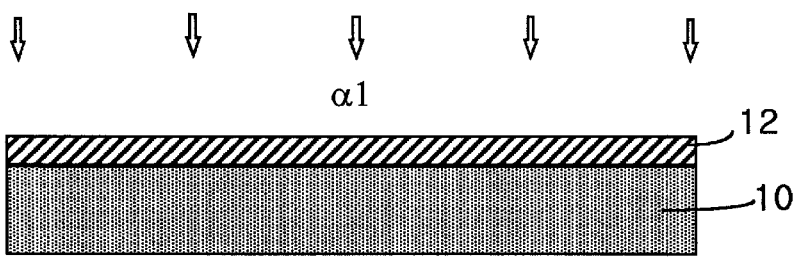
Figure 2C:
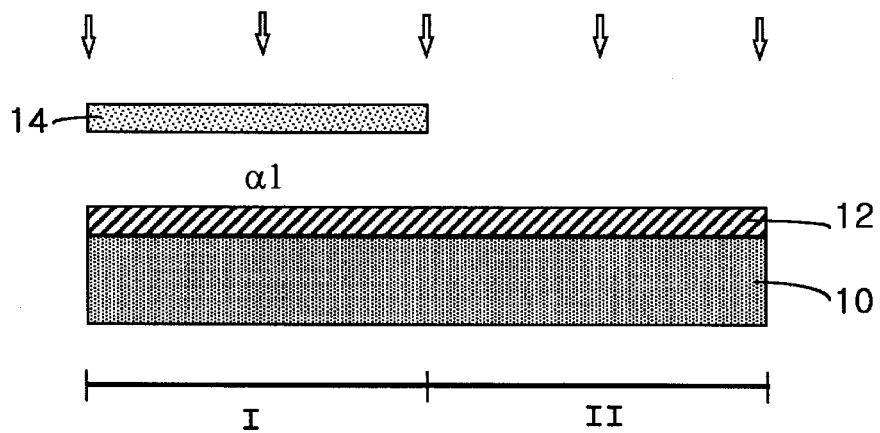
Figure 2D:
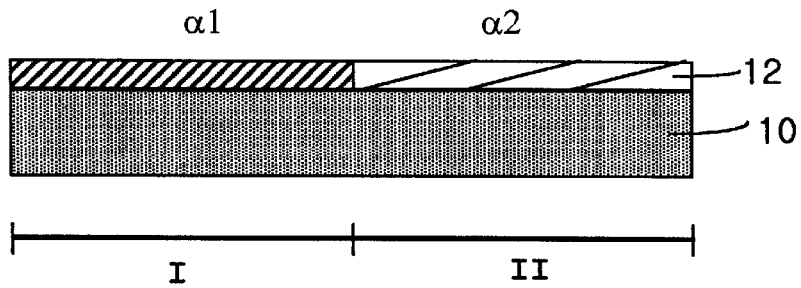
Figure 3A:
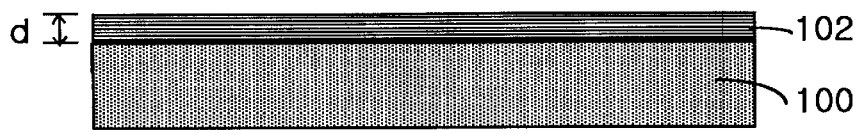
FIGS. 3A to 3F are section views showing a method of fabricating a DDTN LC cell according to a first embodiment of the present invention.

In FIG. 3A, a photoresist of a thickness d on a first substrate 100 is coated to form photoresist layer 102.

Figure 3B:
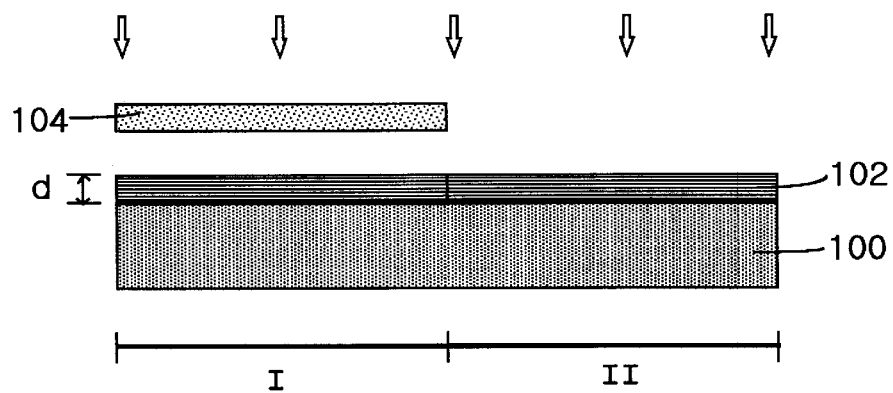

And, in FIG. 3B, each pixel on the first substrate 100 is divided into first and second domains I and II by a mask pattern. Only first domain I is shielded by a mask 104 and the photoresist layer 102 is exposed.

Figure 3C:
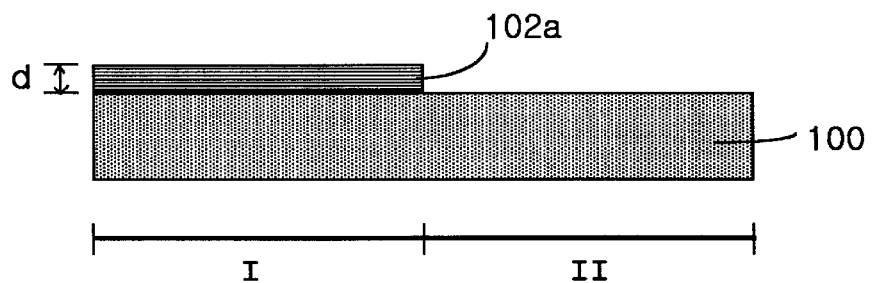

As shown in FIG. 3C, photoresist pattern 102a is formed by removing only the photoresist on the second domain II. Though the FIG. 3C shows a case of using a positive photoresist, a negative photoresist may also be used.

Figure 3D:
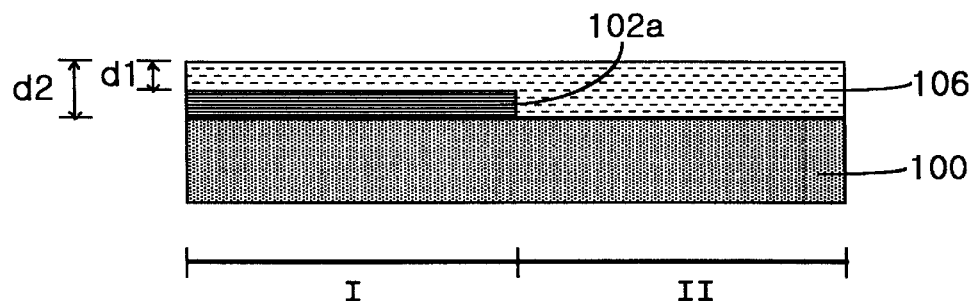

In FIG. 3D, a photo-alignment layer 106 of a specific thickness d2 is coated uniformly on the first substrate 100. Then, on the first domain I a photo-alignment layer 106 of thickness d1 is deposited and on the second domain II a photo-alignment layer 106 of thickness d2 is deposited. At this time, the relation thereof is d2=d+d1. Accordingly, on the second domain II a photo-alignment layer 106 having a relatively high thickness is formed.

Figure 3E:
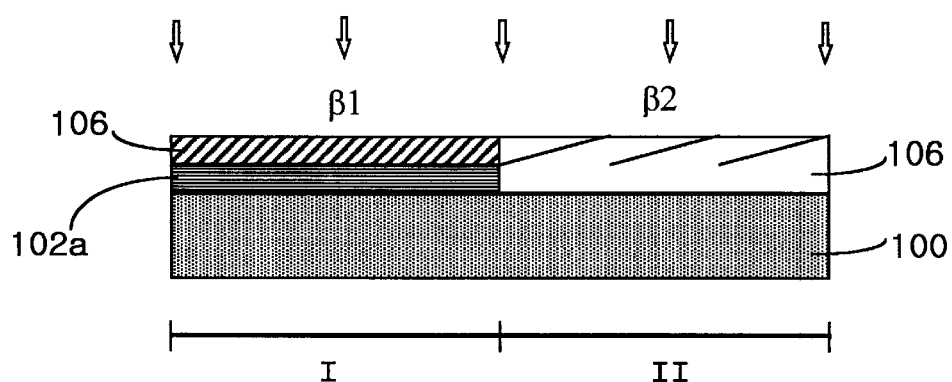

Subsequently, ultraviolet light is irradiated over the first substrate 100 to impart pretilt angles. At this time, because the thicker the photo-alignment layer is, the smaller the pretilt angle becomes, as shown in FIG. 3E, in the first domain I a relatively high pretilt angle β1 is formed and in the second domain II a relatively low pretilt angle β2 is formed. The light irradiation might be performed one or more times depending on the characteristics of photo-alignment process used.

Figure 3F:
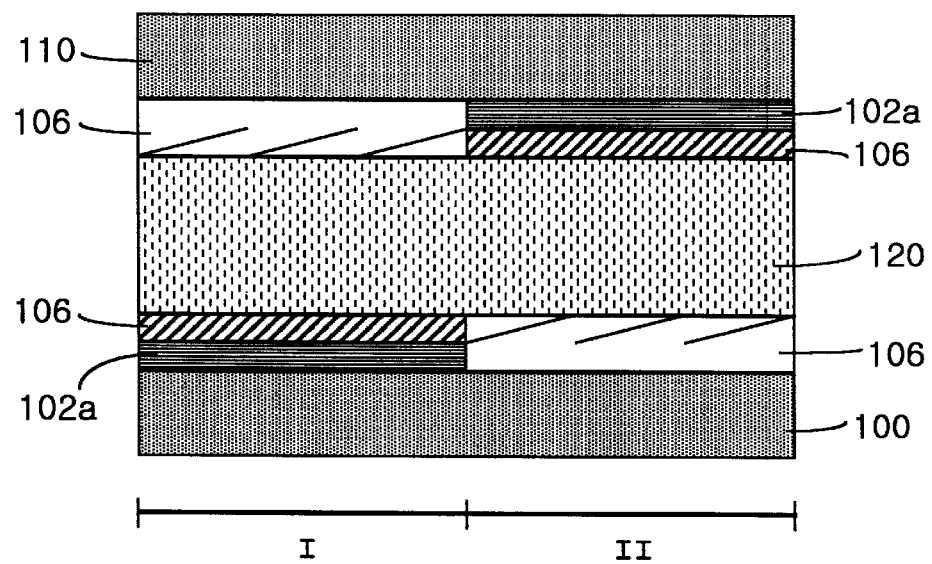

In FIG. 3F, the first substrate 100 and a second substrate 110 formed in a manner as shown in FIGS. 3A to 3E are positioned as the first and second substrates to face each other. And then, the DDTN LC cell is completed by injecting LC between the first and second substrates to form an LC layer 120.

As previously mentioned, while in the first domain I of the DDTN LC cell, its lower part has high pretilt angle β1 and its upper part has low pretilt angle β2, in the second domain II, its lower part has low pretilt angle β2 and its upper part has high pretilt angle β1. Therefore, this compensates light transmittance and a wide viewing angle is obtained. Additionally, the alignment process of the second substrate 110 might be performed by the conventional rubbing method or the conventional photo-alignment method or the photo-alignment method of the present invention.

FIGS. 4A to 4E are section views showing a method of fabricating a DDTN LC cell according to a second embodiment of the present invention.

Figure 4A:
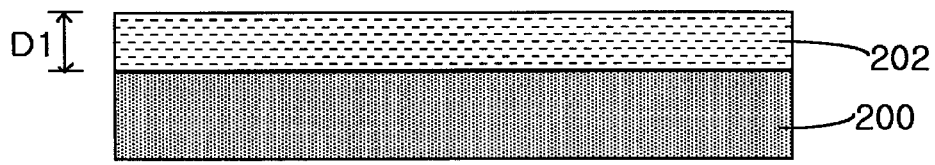
FIGS. 4A to 4E are section views showing a method of fabricating a DDTN LC cell according to a second embodiment of the present invention.

In FIG. 4A, a photo-alignment layer 202 of specific thickness D1 is deposited on a first substrate 200.

Figure 4B:
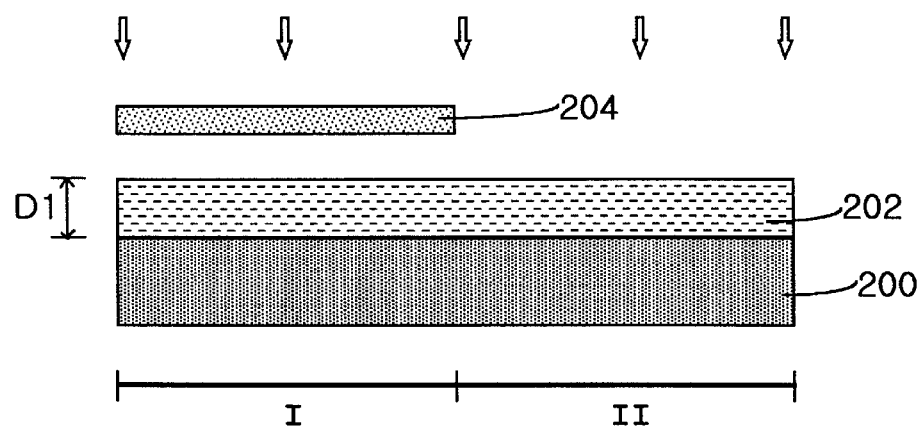

And in FIG. 4B, each pixel on the first substrate 200 is divided into first and second domains I and II by a mask pattern. First domain I is shielded by a mask 204, and the photo-alignment layer 202 is irradiated by a light with high intensity, for example 80W to 90W, thereby etching the photo-alignment layer 202 on second domain II to a depth of D. At this time, as an irradiating light, a laser may be used.

Figure 4C:
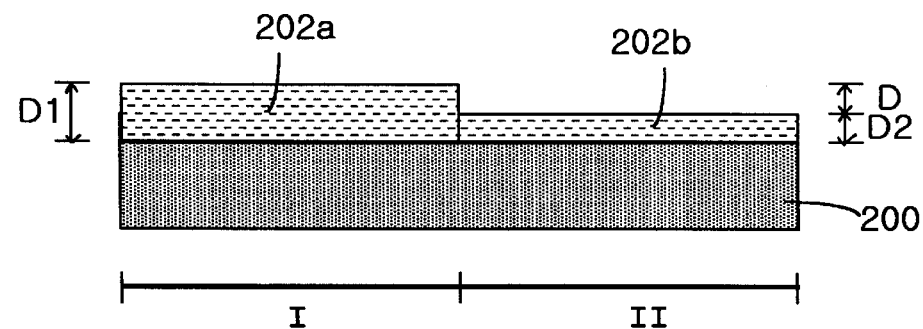

As a result, in FIG. 4C, on first domain I a first photo-alignment pattern 202a is formed relatively thick, on second domain II a second photo-alignment pattern 202b is formed relatively thin. That is, first photo-alignment layer pattern 202a has a thickness of D1, the second photo-alignment layer pattern 202b has a thickness of D2, and the relation thereof is D1=D2+D.

Figure 4D:
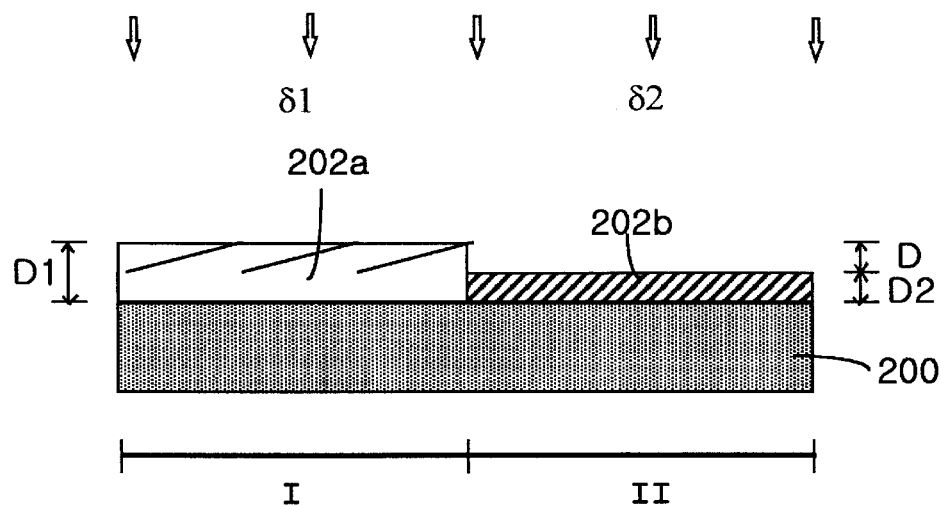

When an ultraviolet light is irradiated on first substrate 200 for a specific time, as shown in FIG. 4D, a first pretilt angle δ1 and a second pretilt angle δ2 are formed in first domain I and second domain II respectively. First pretilt angle δ1 is relatively smaller than second pretilt angle δ2.

Figure 4E:
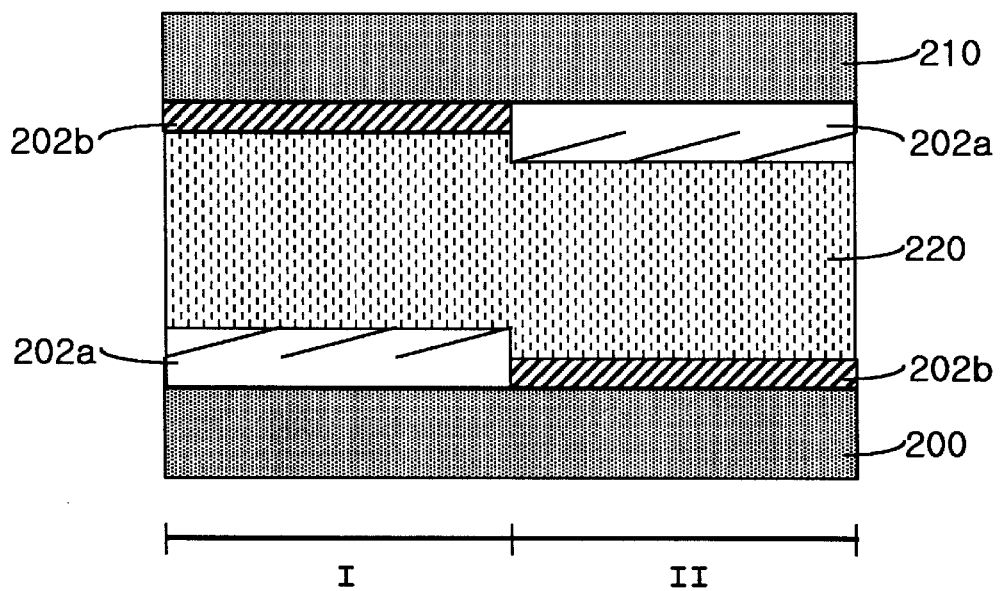

In FIG. 4E, first substrate 200 and second substrate 210 formed in a manner as shown in FIGS. 4A to 4D are positioned as the first and second substrates to face each other. And then, the DDTN LC cell is completed by injecting LC between the first and second substrates to form an LC layer 220.

As previously mentioned, while in the first domain I of the DDTN LC cell, its lower part has low pretilt angle δ1 and its upper part has high pretilt angle δ2, in the second domain II, its lower part has high pretilt angle δ2 and its upper part has low pretilt angle δ1. Therefore, this compensates light transmittance and wide viewing angle is obtained. Additionally, the alignment process of the second substrate 210 might be performed by the conventional rubbing method or the conventional photo-alignment method or the photo-alignment method of the present invention.

Compared with the method for fabricating a DDTN LC cell by the rubbing method, because the present invention does not use a rubbing process, it avoids dust generation, which may affect the picture quality. Moreover, because it does not involve a photolithography process, it prevents the pretilt angle from being damaged and reliability of elements from falling. Also, the overall process is simplified.

Compared with the conventional photo-alignment process, the present invention shortens light irradiating time and does not involve a masking process during light irradiation. This avoids dust generation and simplifies the process.

It will be apparent to those skilled in the art that various modifications and variations can be made in the method of the present invention and in construction of this multi-domain LC cell without departing from the scope or spirit of the invention. For example, the present invention is not limited to two domain LC cells, but may be applied to multi-domain LC cells having two or more domains.

The foregoing description assumes that the photo-alignment material used has the characteristic such that for a given quantity of light irradiated, the thicker the photo-alignment layer, the smaller pretilt angle of the photo-alignment layer becomes. However, a photo-alignment material having an opposite characteristic may be used as well—that is the thicker the photo-alignment layer, the greater the pretilt angle becomes.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for fabricating a domain-divided twisted nematic liquid crystal cell, comprising:

providing a first substrate having a first domain and a second domain;

forming a photosensitive material over said first substrate;

removing differentially said photosensitive material from said first and second domains;

forming a photo-alignment layer uniformly over said photosensitive material to form a first photo-alignment layer having a first thickness over said first domain and a second photo-alignment layer having a second thickness different from the first thickness over said domain; and irradiating said first and second photo-alignment layers with a light to impart first and second pretilt angles different from each other, respectively.

2. The method according to claim 1, wherein said irradiating said first and second photo-alignment layers includes irradiating said first and second photo-alignment layers with said light one or more times.

3. The method according to claim 1, wherein said light includes an ultraviolet light.

4. The method according to claim 1, further comprising:

providing a second substrate facing said first substrate, said second substrate having first and second domains corresponding to the first and second domains of said first substrate, respectively; and forming a first photo-alignment layer having a first thickness over the first domain of said second substrate and a second photo-alignment layer having a second thickness over the second domain of said second substrate, the first and second thicknesses of said first and second photo-alignment layers, respectively, of the second substrate being different from each other.

5. The method according to claim 4, further comprising irradiating said first and second photo-alignment layers of said second substrate with a light to form different pretilt angles in said first and second domains of said second substrate.

6. The method according to claim 1, further comprising:

providing a second substrate facing said first substrate, said second substrate having first and second domains corresponding to the first and second domains of said first substrate, respectively; and rubbing said first and second alignment layers to form different pretilt angles in said first and second domains of said second substrate.

7. The method according to claim 1, wherein said removing includes a photo etching process.

8. A method for fabricating a domain-divided twisted nematic liquid crystal cell, comprising:

providing a first substrate having a first domain and a second domain;

forming a photo-alignment material uniformly over said first substrate;

removing differentially said photo-alignment material from said first and second domains;

forming a photo-alignment layer uniformly over said photo-alignment material to form a first photo-alignment layer having a first thickness over said first domain and a second photo-alignment layer having a second thickness different from the first thickness over said domain; and irradiating said first and second photo-alignment layers with a light to impart first and second pretilt angles different from each other, respectively.

9. The method according to claim 8, wherein said removing includes differentially irradiating said photo-alignment material with a light.

10. The method according to claim 9, wherein said light has an intensity of 80W to 90W.

11. The method according to claim 9, wherein said light includes a laser.

12. A method for fabricating a domain-divided twisted nematic liquid crystal cell, comprising:

providing a fist substrate having a first domain and a second domain;

forming a photosensitive material over said first substrate;

removing selectively said photosensitive material formed over said second domain;

forming a photo-alignment layer uniformly over an entire surface of said substrate; and irradiating said photo-alignment layer with a light to impart first and second pretilt angles different from each other, respectively.

13. The method according to claim 12, wherein said irradiating said photo-alignment layer includes irradiating said photo-alignment layer with said light one or more times.

14. The method according to claim 12, wherein said light includes an ultraviolet light or a laser.

15. The method according to claim 12, further comprising:

providing a second substrate facing said first substrate, said second substrate having first and second domains corresponding to said first and second domains of said first substrate, respectively; and forming a first photo-alignment layer having a first thickness over said first domain of said second substrate and a second photo-alignment layer having a second thickness over said second domain of said second substrate, wherein said first and second thickness of said first and second photo-alignment layers of said second substrate are different from each other.

16. The method according to claim 12, further comprising:

providing a second substrate facing said first substrate, said second substrate having first and second domains corresponding to said first and second domains of said first substrate, respectively; and rubbing said photo-alignment layer to form different pretilt angles in said first and second domains of said second substrate.

17. The method according to claim 12, wherein said removing includes a photo etching process.

* * * * *

UNITED STATES PATENT AND TRADEMARK OFFICE
CERTIFICATE OF CORRECTION

PATENT NO.    : 6,661,489 B1
DATED         : December 9, 2003
INVENTOR(S)   : Jung Ha Kim et al.

It is certified that error appears in the above-identified patent and that said Letters Patent is hereby corrected as shown below:

Title page,
Item [54], Title, delete "HAVING A DIFFERENTIALLY REMOVED PHOTOSENTSITIVE LAYER".

Column 6,
Line 15, "fist" should read -- first --.
Line 19, "selectively" should read -- differentially --.

Signed and Sealed this

Twenty-fifth Day of May, 2004

JON W. DUDAS
*Acting Director of the United States Patent and Trademark Office*